US012470555B2

(12) United States Patent
Satyanarayana et al.

(10) Patent No.: US 12,470,555 B2
(45) Date of Patent: Nov. 11, 2025

(54) ADDING THIRD PARTY HARDWARE TO NETWORK DEVICES

(71) Applicant: Juniper Networks, Inc., Sunnyvale, CA (US)

(72) Inventors: Vyasraj Satyanarayana, Bangalore (IN); Eswaran Srinivasan, Fremont, CA (US); Dmitry A. Shokarev, Mountain View, CA (US); Parag Dubey, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 233 days.

(21) Appl. No.: 16/947,504

(22) Filed: Aug. 4, 2020

(65) Prior Publication Data

US 2022/0046019 A1  Feb. 10, 2022

(51) Int. Cl.
*H04L 9/40* (2022.01)
*G06F 1/3234* (2019.01)
(Continued)

(52) U.S. Cl.
CPC ............ *H04L 63/10* (2013.01); *G06F 1/3234* (2013.01); *G06F 9/541* (2013.01);
(Continued)

(58) Field of Classification Search
CPC .... G06F 13/4081; G06F 1/187; G06F 1/3221; G06F 13/28; G06F 13/4221; G06F 2213/0026; G06F 2213/0036
See application file for complete search history.

(56) References Cited

U.S. PATENT DOCUMENTS 8,229,812 B2  7/2012  Raleigh
8,342,935 B1 *  1/2013  Morrow .............. G07F 17/3202
                                                      463/20
(Continued)

FOREIGN PATENT DOCUMENTS

CN  102365633 A  2/2012
CN  107273255 A  10/2017
(Continued)

OTHER PUBLICATIONS

Extended Search Report from counterpart European Application No. 20202540.9, dated Feb. 11, 2021, 8 pp.
(Continued)

*Primary Examiner* — Henry Tsai
*Assistant Examiner* — Christopher A Bartels
(74) *Attorney, Agent, or Firm* — Shumaker & Sieffert, P.A.

(57) ABSTRACT

An example network device includes one or more hardware resources; a physical interface for receiving a hardware component; a memory; and one or more processors implemented in circuitry and configured to: receive the hardware component that has been coupled to the physical interface of the network device; receive data for an application programming interface (API) for the hardware component; store the data for the API to the memory; and execute the data for the API to grant the hardware component secure access to the hardware resources of the network device via the API. The hardware component may be an optical network interface. The resources may be raw registers of the network device. The processors may further tune the hardware component according to configuration for the network device, such as power management configuration for the network device, or the network device itself.

15 Claims, 4 Drawing Sheets

(51) Int. Cl.
*G06F 9/54* (2006.01)
*G06F 13/42* (2006.01)
*H04L 41/00* (2022.01)

(52) U.S. Cl.
CPC .......... *G06F 13/4282* (2013.01); *H04L 41/24* (2013.01); *G06F 2213/0016* (2013.01)

(56) References Cited

U.S. PATENT DOCUMENTS

| | | | |
|---|---|---|---|
| 9,495,245 B2* | 11/2016 | Peddle | G06F 13/4059 |
| 9,843,624 B1 | 12/2017 | Taaghol et al. | |
| 10,185,670 B2* | 1/2019 | Litichever | G06F 13/107 |
| 10,243,840 B2 | 3/2019 | Babu et al. | |
| 10,608,819 B1* | 3/2020 | Brown | G06F 21/74 |
| 10,659,051 B1* | 5/2020 | Tiwari | H03K 19/018592 |
| 2004/0010612 A1* | 1/2004 | Pandya | H04L 69/161 |
| | | | 709/213 |
| 2005/0138620 A1 | 6/2005 | Lewites | |
| 2010/0162260 A1* | 6/2010 | Ibrahim | H04L 63/10 |
| | | | 719/315 |
| 2013/0132979 A1 | 5/2013 | Ross | |
| 2014/0007076 A1 | 1/2014 | Kim et al. | |
| 2014/0098671 A1 | 4/2014 | Raleigh et al. | |
| 2015/0033282 A1 | 1/2015 | O'Hern et al. | |
| 2015/0199010 A1* | 7/2015 | Coleman | G16H 40/67 |
| | | | 345/156 |
| 2015/0205749 A1* | 7/2015 | Whitby-Strevens | |
| | | | H04N 21/4223 |
| | | | 348/207.11 |
| 2015/0355965 A1* | 12/2015 | Peddle | G06F 11/1048 |
| | | | 710/308 |
| 2016/0007083 A1* | 1/2016 | Gurha | H04N 21/25808 |
| | | | 725/13 |
| 2016/0235324 A1* | 8/2016 | Mershin | A61B 5/6803 |
| 2017/0115987 A1* | 4/2017 | Peixoto Machado da Silva | |
| | | | G11C 29/028 |
| 2018/0060261 A1* | 3/2018 | Chhor | G06F 13/4282 |
| 2018/0121381 A1* | 5/2018 | Podsiadlo | G06F 13/404 |
| 2018/0225230 A1* | 8/2018 | Litichever | G06F 21/56 |
| 2018/0275990 A1* | 9/2018 | Peixoto Machado da Silva | |
| | | | G06F 13/4282 |
| 2019/0113973 A1* | 4/2019 | Coleman | H04L 12/16 |
| 2019/0125458 A1* | 5/2019 | Shelton, IV | A61B 17/105 |
| 2019/0125459 A1* | 5/2019 | Shelton, IV | G16H 40/63 |
| 2019/0200977 A1* | 7/2019 | Shelton, IV | A61B 34/35 |
| 2019/0228768 A1* | 7/2019 | Kim | G06F 1/08 |
| 2019/0273754 A1* | 9/2019 | Ting | G06F 9/50 |
| 2019/0303342 A1* | 10/2019 | Jen | G06F 13/364 |
| 2019/0327506 A1* | 10/2019 | Zou | H04N 21/2223 |
| 2019/0370401 A1 | 12/2019 | Grant et al. | |
| 2019/0385057 A1* | 12/2019 | Litichever | H04L 63/14 |
| 2020/0028776 A1 | 1/2020 | Atli et al. | |
| 2020/0293697 A1* | 9/2020 | Sion | H04L 63/10 |
| 2022/0103499 A1* | 3/2022 | Spolnicki | H04L 12/1859 |
| 2022/0197773 A1* | 6/2022 | Butler | G06F 9/505 |

FOREIGN PATENT DOCUMENTS

| | | |
|---|---|---|
| CN | 108540381 A | 9/2018 |
| EP | 3179689 A1 | 6/2017 |
| WO | 2012134080 A2 | 10/2012 |

OTHER PUBLICATIONS

Response to Extended Search Report dated Feb. 16, 2022, from counterpart European Application No. 20202540.9 filed Aug. 8, 2022, 23 pp.

Notice of Intent to Grant and Text Intended to Grant from counterpart European Application No. 20202540.9 dated Sep. 21, 2023, 30 pp.

First Office Action and Search Report, and translation thereof, from counterpart Chinese Application No. 2020111182687 dated Feb. 20, 2024, 15 pp.

Lu et al., "Design and implementation: an open and reconfigurable router architecture with different network system supported", Journal on Communications, vol. 34, No. 3, Mar. 15, 2013, pp. 126-133, Translation provided for only the Abstract.

Second Office Action, and translation thereof, from counterpart Chinese Application No. 202011118268.7 dated Dec. 6, 2024, 7 pp.

* cited by examiner

ADDING THIRD PARTY HARDWARE TO NETWORK DEVICES

TECHNICAL FIELD

This disclosure relates to network devices.

BACKGROUND

Network devices include various components that perform various tasks. For example, network devices include physical interfaces of various types for exchanging data (e.g., in the form of packets) with other network devices. Network devices may also include security components, routing components, forwarding components, service components, and others. These hardware components may be controlled and managed by software, such as an operating system and software interfaces to the hardware, such as application programming interfaces (APIs). As one example, network devices may provide support for fiber-optical network interfaces.

Certain components of a network device may be developed by a manufacturer of the network device, while other components may be developed by third party developers. Third party developers typically do not develop software for their components that is fully compatible with all possible network devices, even when the components are compliant with relevant standards. The components may have major and/or minor deviations from the standards. These deviations may result in component usage errors or failure across network device software and hardware platforms. Resolving these issues and inducting these components into the operating system and other network device software is a cost to both the network device manufacturer and its customers.

When such problems are encountered, customers may return the component and/or network device to its respective manufacturer. These manufacturers may then validate the component, and then develop relevant software specific for the component and network device. Thus, software must be distributed to network devices across customers. This may result in down-time to customers to install the software update, due to upgrade procedures involved on all network device nodes. This approach may result in loss of revenue and time to both customers as well as the manufacturers.

SUMMARY

In general, this disclosure describes techniques related to workflows for developing software for network devices and hardware components thereof. In particular, these workflow techniques do not require major software re-releases, and may minimize involvement by the manufacturer of the network devices. In this manner, these techniques may reduce qualification and induction related to incorporating new hardware components into deployed network devices. For example, whereas conventional techniques may require about a year of updates from release of a new, third party hardware component until the new hardware component can be fully used in deployed network devices, these techniques may only require a few weeks of development.

In one example, a method includes receiving, by a network device, a hardware component that has been coupled to the network device; receiving, by the network device, data for an application programming interface (API) for the hardware component; and executing, by the network device, the API for the hardware component to grant the hardware component secure access to hardware resources of the network device via the API.

In another example, a network device includes one or more hardware resources; a physical interface for receiving a hardware component; a memory; and one or more processors implemented in circuitry and configured to: receive the hardware component that has been coupled to the physical interface of the network device; receive data for an application programming interface (API) for the hardware component; store the data for the API to the memory; and execute the API to grant the hardware component secure access to the hardware resources of the network device via the API.

In another example, a non-transitory computer-readable storage medium has stored thereon instructions that, when executed, cause a processor of a network device to receive a hardware component that has been coupled to the network device; receive data for an application programming interface (API) for the hardware component; and execute the data for the API for the hardware component to grant the hardware component secure access to hardware resources of the network device via the API.

The details of one or more examples are set forth in the accompanying drawings and the description below. Other features, objects, and advantages will be apparent from the description and drawings, and from the claims.

DETAILED DESCRIPTION

Figure 1:
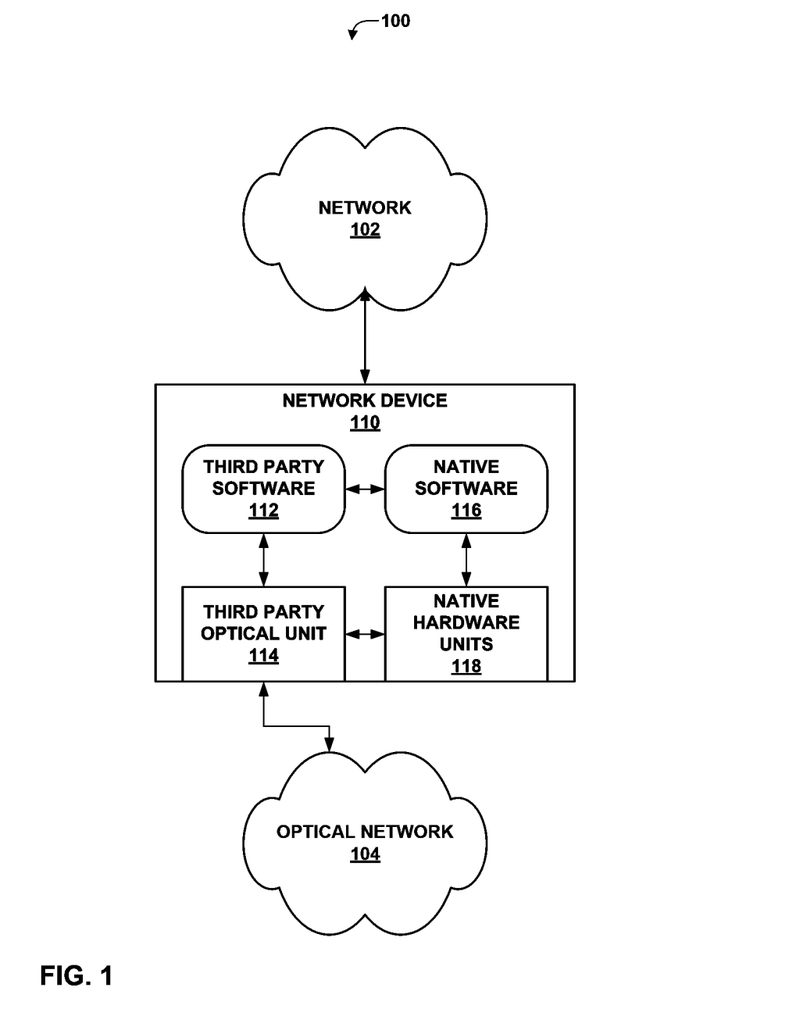
FIG. 1 is a block diagram illustrating an example system including a network device configured according to the techniques of this disclosure.

FIG. 1 is a block diagram illustrating an example system 100 including a network device 110 configured according to the techniques of this disclosure. System 100 includes network device 102, network device 110, and optical network 104. Network 102 and optical network 104 represent computer networks in which one or more various network devices operate, such as routers, switches, hubs, gateways, firewalls, and the like. Network 102 may represent, for example, an Ethernet network, while optical network 104 represents a network in which network devices communicate via optical fibers.

Network device 110 may be a router, switch, security device, gateway, or other network device. In general, routers determine routes through networks such as network 102 and optical network 104. Each route may represent a series of connections between network devices forming the respective networks to reach a particular destination. Network device 110 may determine the routes and use the routes to determine which route is best for reaching a particular destination. Network device 110 may further determine forwarding information, e.g., a network device to which to direct network traffic to reach a particular destination. Network device 110 may form the forwarding information to specify a physical network interface by which to output network traffic, e.g., network packets, to reach a destination of the packets.

In the example of FIG. 1, network device 110 includes native software 116 and native hardware units 118. Native software 116 may include, for example, an operating system and other control software, as well as software for performing routing protocols, forwarding protocols, security procedures, and other processes or network protocols. In this example, network device 110 further includes third party optical unit 114, and executes third party software 112 to control third party optical unit 114. Third party optical unit 114 may be developed by a third party developer that is different than a manufacturer of network device 110. In accordance with the techniques of this disclosure, the manufacturer may produce a software development kit (SDK) for developing software to be executed by network device 110 for controlling third party hardware components, such as third party optical unit 114.

The developer of third party optical unit 114 may use the SDK to produce third party software 112, which may include an application programming interface (API) for providing two-way communication between third party optical unit 114 and resources of network device 110, such as native hardware units 118. Such resources of native hardware units 118 may include, for example, raw registers or other hardware resources.

The approach to allowing third party developers to use the SDK to produce third party software 112 builds on a clean separation of third party software 112 (e.g., optical unit management code) from native software 116. This approach also offers the ability to upgrade hardware of network device 110, such as with an independent optical unit agile build. This code separation allows a release of third party software 112 to be smaller than for a full update of native software 116.

As one example, the third party developer may develop third party software 112 to include optical unit management software using an optics SDK. The optics SDK may be publicly available for hardware developers and include well-defined APIs. Hardware developers (e.g., optical unit hardware vendors) may use the optics SDK to build and release optics plug-in code compatible with native hardware units 118 and native software 116. The optics SDK may also allow any hardware-specific tuning of third party optical unit 114 for network device 110 and native hardware units 118. The optics SDK may further allow for turning of network device 110 and native hardware units 118 to accommodate features of third party optical network unit 114.

An optics SDK is merely one example SDK that a vendor or developer may use to develop third party software 112. In other examples, other vendors or developers may develop other types of third party hardware and, using respective SDKs, third party software for controlling the third party hardware. Such third party hardware units may include, for example, hardware security units, hardware Ethernet network interfaces, hardware line cards, or the like.

The SDK mechanism described above supports per-vendor, per-device-type APIs as additional installable packages (represented by third party software 112). This allows small upgrades of deployed network devices, such as network device 110. This approach also allows network device manufacturer proprietary features to be visible to trusted vendors, allowing the vendors to add value to third party hardware such as third party optical unit 114. Furthermore, this mechanism allows third party vendors and developers to be ready to develop software that is compatible with network device 110, native software 116, and native hardware units 118.

The SDK APIs may expose some or all of native hardware units 118 to third party optical unit 114 and third party software 112. For example, the SDK APIs may expose an I2C bus, a serial peripheral interface (SPI), or the like, and handle any specific intricacies related to reads and/or writes from and to such elements. Furthermore, the SDK APIs may allow both host and module side parameters to be automatically tuned. For example, network device 110 may automatically tune continuous-time linear equalizers (CTLEs) along with serial interface (SI) parameters on a board of network device 110.

In this manner, the techniques of this disclosure may provide certain advantages over conventional development techniques. In conventional techniques, third party developers and vendors do not have access to network device manufacturer SDKs, and therefore generally cannot develop software including APIs that have access to internal hardware components of the network device. Thus, the third party developers may create a hardware component and corresponding software that does not function entirely correctly in the network device. Once customers observe a problem with the third party software, the customers may submit a report to the network device manufacturer indicating the problem. The network device manufacturer would generally then need to triage the problem and incorporate relevant fixes into a mainstream software release (e.g., into an update to native software 116). The network device manufacturer would then qualify the third party hardware in a lab and release the mainstream software to the customers, who may install the mainstream software along with other features. This entire process often takes over a year to complete, and may be expensive to customers and to the network device manufacturer. By contrast, using the techniques of this disclosure, the third party developer or vendor can create the third party software using relevant SDKs, which may reduce the process to just a few weeks (e.g., three weeks).

Figure 2:
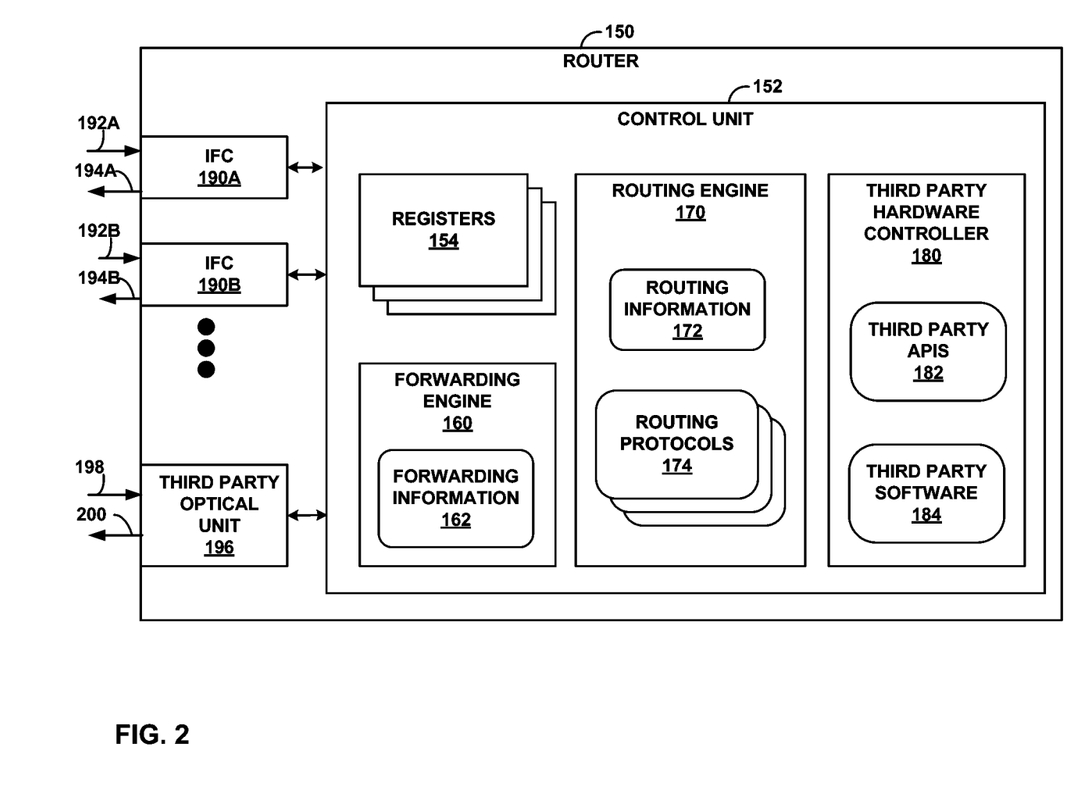
FIG. 2 is a block diagram illustrating an example router including a third party hardware controller configured according to the techniques of this disclosure.

FIG. 2 is a block diagram illustrating an example router 150 including a third party hardware controller 180 configured according to the techniques of this disclosure. Router 150 also includes third party optical unit 196, as well as third party hardware controller 180 including third party application programming interfaces (APIs) 182 and third party software 184. Third party hardware controller 180, third party APIs 182, and third party software 184 may be installed in memory of control unit 152. Router 150 may correspond to network device 110 of FIG. 1, third party optical unit 196 may correspond to third party optical unit 114 of FIG. 1, and third party APIs 182 and third party software 184 may, together, correspond to third party software 112 of FIG. 1.

In the example of FIG. 2, router 150 includes interface cards 190A, 190B (IFCs 190), and control unit 152. Control unit 152 includes registers 154, packet forwarding engine (PFE) 160, routing engine (RE) 170, and third party hardware controller 180. Control unit 152 may be implemented in the form of one or more processors implemented in circuitry. Registers 154 represent multiple processor registers for storing data to be processed by control unit 152. Although not shown, control unit 152 may also include one or more arithmetic logic units (ALUs) or other hardware elements for performing various processing operations, which may store, output, and/or manipulate data stored in registers 154. In some examples, any or all of PFE 160, RE 170, and/or third party hardware controller 180 may include respective sets of one or more registers as well (not shown in FIG. 2).

IFCs 190 receive data via respective inbound links 192A, 192B (inbound links 192) and send data via outbound links 194A, 194B (outbound links 194). Inbound links 192 and outbound links 194 in some examples form common, physical communication media for the IFCs, which operate in full duplex mode. That is, in some examples, each of IFCs 190 are coupled to respective communication media that can send and receive data substantially simultaneously. In other examples, inbound links 192 and outbound links 194 form separate physical media for respective IFCs 190.

Control unit 152 includes processing hardware and, in some examples, software and/or firmware executed by the processing hardware. In various examples, control unit 152 and the various elements thereof, e.g., PFE 160 and RE 170, are implemented in one or more processors, processing units, digital signal processors (DSPs), application specific integrated circuits (ASICs), field programmable gate arrays (FPGAs), or any combination thereof. When implemented in software or firmware, control unit 152 includes one or more processors or processing units for executing instructions for the software or firmware, as well as a computer-readable storage medium for storing the instructions. In some examples, elements of PFE 160 and RE 170 are implemented in discrete units or modules, while in other examples, PFE 160 and RE 170 are functionally integrated.

RE 170 includes instructions for one or more routing protocols 174. Routing protocols 174 include any or all of interior gateway routing protocols such as open shortest path first (OSPF), intermediate system to intermediate system (IS-IS), routing information protocol (RIP), interior gateway routing protocol (IGRP), enhanced IGRP (EIGRP), and/or exterior gateway routing protocols, such as border gateway protocol (BGP). In general, interior gateway routing protocols are used to exchange routing information between routers of an autonomous system. Routing protocols 174 further include protocols related to network tunneling, such as MPLS, label distribution protocol (LDP), resource reservation protocol traffic engineering (RSVP-TE), or other protocols.

In general, RE 170 executes routing protocols 174 to determine routes between network devices, e.g., routes from router 150 to other network devices. Other routers coupled to router 150 via IFCs 190 advertise routes to router 150. When router 150 receives a communication from another router that advertises a new route, RE 170 receives the communication and stores the new route in routing information 162 (also referred to as a routing information base). RE 170 also executes routing protocols 174 to prioritize routes from router 150 to a destination. That is, when routing information 162 includes information indicating that multiple routes exist to a common destination, RE 170 executes routing protocols 174 to select one of the routes to reach the destination.

The selected route to reach the destination generally includes an indication of a "next hop" along the route to reach the destination. This next hop typically corresponds to a network device, such as, for example, another router, switch, gateway, or other network device along the route to reach the destination. The next hop device is connected to router 150 via one of IFCs 190. Accordingly, using the selected route to reach a destination, control unit 152 can determine the one of IFCs 190 connected to the next hop along the route to the destination and update forwarding information stored by PFE 160 to indicate the one of IFCs 190 to which to send packets destined for the destination.

More specifically, PFE 160 maintains forwarding information base (FIB) 162. Then, in response to receiving information from routing engine 170, PFE 160 updates FIB 162 to map a destination address to one of IFCs 190, based on the next hop along the route to reach the destination address. FIB 162 also includes information indicating how to forward packets associated with a network tunnel, e.g., packets having one or more labels and/or packets to which to append one or more labels.

Third party hardware controller 180 represents an example set of software that a developer or vendor of third party optical unit 196 may create using a corresponding SDK. In some examples, third party hardware controller 180 may be implemented in a combination of hardware, software, and/or firmware. When implemented at least in part in software or firmware, router 150 may include requisite hardware for executing instructions of the software or firmware, such as control unit 152 and processing units thereof. In this example, third party hardware controller 180 includes third party APIs 182 and third party software 184.

Third party optical unit 196 includes a light emitter (e.g., a laser) for transmitting data 200 and an optical receiver for receiving data 198. In general, third party software 184 may control third party optical unit 196. For example, third party software 184 may include implementations of optical network protocols and configuration for third party optical unit 196. Third party software 184 may, for example, control the light emitter for transmitting data 200, such as by controlling an amount of power to use to drive the light emitter. In some examples, third party software 184 may configure (e.g., tune) the amount of power used to drive the light emitter according to configuration of router 150, such as a power management configuration of router 150.

Third party APIs 182 may grant third party hardware controller 180 and third party optical unit 196 secure access to internal components of router 150, such as registers 154. Although not shown, third party APIs 182 may also grant third party hardware controller 180 and third party optical unit 196 secure access to an I2C bus and/or an SPI.

Control unit 152 may be configured to determine that third party optical unit 196 has been installed and receive data for third party hardware controller 180. For example, a user may install third party hardware controller 180 (including data for third party APIs 182 and third party software 184) and third party optical unit 196 in router 150. Accordingly, control unit 152 may execute third party software 184 to grant third party hardware controller 180 and third party optical unit 196 secure access to hardware resources and components of router 150, such as registers 154, via, e.g., third party APIs 182.

Allowing a third party developer or vendor to create third party hardware controller 180 via a corresponding SDK allows for a clean separation of code from other software executed by control unit 152. Third party hardware controller 180, third party APIs 182, and third party software 184 may be implemented as a standalone library of software for controlling third party optical unit 196 (or other third party hardware units, such as hardware security units, hardware line cards, hardware Ethernet interfaces, or the like).

As an example, third party hardware controller 180 may be configured to dynamically link with additional libraries and drivers on a per-vendor, per-device-type basis. As an example, third party hardware controller 180 may dynamically link with a {vendor: SOURCE PHOTONICS, QSFP-100GBASE-LR4-T2, part-no: 740-061409} package, and/or a separate package of {vendor: AVAGO, 40GBASE SR4, part-no: 740-046565}. For each of these examples, a network device such as router 150 may have a different implementation. For example, Juniper Networks PTX10008 hardware may be configured as:

```
PTX10008 Hardware {
    {vendor: AVAGO, 40GBASE SR4, part-no: 740-046565} {
        Rx_preemphasis_settings = 0x2
        Tx_equalization_settings = 0x3
    }
    ...
}
```
whereas Juniper Networks PTX10003-80C hardware may be configured as:
```
PTX10003-80C Hardware {
    {vendor: AVAGO, 40GBASE SR4, part-no: 740-046565} {
        Rx_preemphasis_settings = 0x3
        Tx_equalization_settings = 0x5
    }
    ...
}
```

In addition, initialization and management of these devices may vary across each type of hardware device.

This combination of network devices from a particular manufacturer and third party hardware units from various vendors may multiply. By accommodating various possibilities in a database package and independently installable packages, the work to change to a new third party hardware unit (e.g., third party optical unit 196) may be simplified.

In this manner, router 150 represents an example of a network device including one or more hardware resources; a physical interface for receiving a hardware component; a memory; and one or more processors implemented in circuitry and configured to: determine that the hardware component has been coupled to the physical interface of the network device; receive data for an application programming interface (API) for the hardware component; store the data for the API to the memory; and execute the data for the API to grant the hardware component secure access to the hardware resources of the network device via the API.

Figure 3:
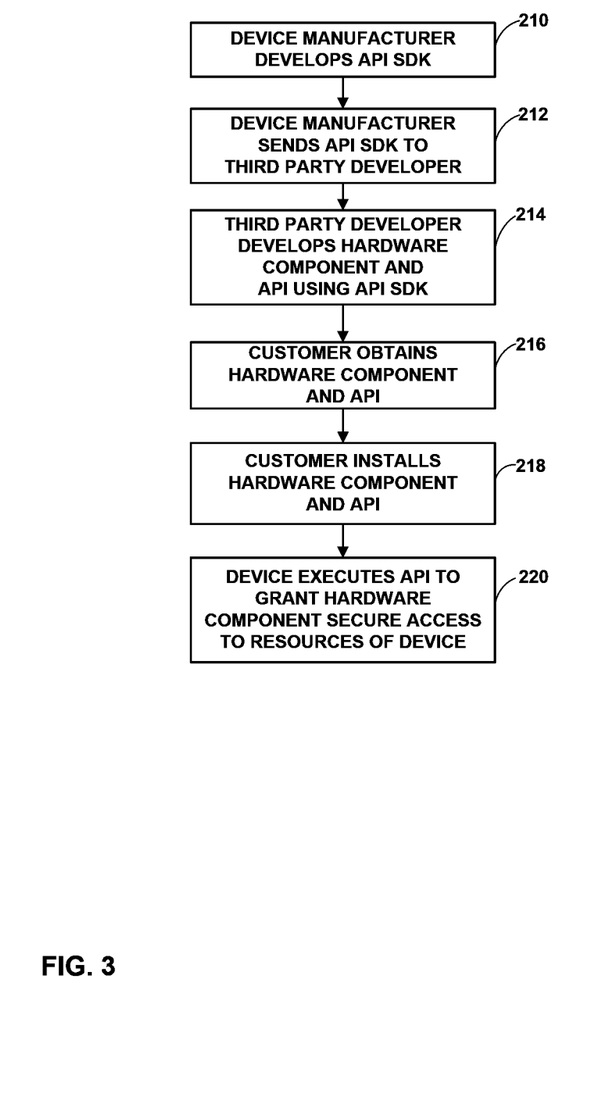
FIG. 3 is a flowchart illustrating an example workflow for implementing and releasing a new third party hardware component and corresponding third party software according to the techniques of this disclosure.

FIG. 3 is a flowchart illustrating an example workflow for implementing and releasing a new third party hardware component and corresponding third party software according to the techniques of this disclosure. In the example of FIG. 3, a device manufacturer develops an API SDK (210). The device manufacturer represents the manufacturer of a network device, such as network device 110 (FIG. 1) or router 150 (FIG. 2). The API SDK allows third party vendors and developers to implement third party software for controlling a third party hardware component and defines APIs that allow the third party hardware component to securely access resources of the network device. The resources may include, for example, raw registers, an I2C interface, or an SPI of the network device.

The device manufacturer then sends the API SDK to a third party developer (212). In some examples, the device manufacturer may publish the API SDK publicly. In other examples, the device manufacturer may send the third party developer the API SDK directly, e.g., electronically, by mail, or the like.

The third party developer then develops the third party hardware component and an API for the third party hardware component using the API SDK (214). For example, the third party developer may develop an optical component for accessing optical networks via fiberoptic cables. The third party developer may also develop the API using the SDK, as well as other controller software, such as third party hardware controller 180, third party APIs 182, and third party software 184 (FIG. 2) or third party software 112 (FIG. 1).

A customer may then obtain the third party hardware component and the API (216). For example, the customer may purchase the third party hardware component and receive data for the API, along with other controller software for the third party hardware component. The customer may then install the third party hardware component and the API and other software in a deployed network device (218) manufactured by the network device manufacturer. The network device may install and execute the API to grant the third party hardware component secure access to resources of the network device (220).

Various example workflows may be performed according to the example of FIG. 3. In one example, a vendor (or developer) releases a new optical hardware unit and uses the SDK of a network device manufacturer to build one or more add-on packages for network devices of the network device manufacturer. A customer of the network device manufacturer who owns one or more of the network devices from the manufacturer may use the add-on package, along with the new optical hardware unit, in the network devices. The vendor may then claim that all of the modules are ready for deployment to network devices from the network device manufacturer.

In another example, a vendor may release a new optical module for a network device of a manufacturer. A customer who owns one of the network devices from the manufacturer may, as an alternative use the SDK themselves to build an add-on package for the network device and install the add-on package. Thus, rather than the developer using the SDK to build the add-on package, the customer may instead build the add-on package using the SDK.

As yet another example, a vendor may release a new optical module for a network device of a manufacturer. The manufacturer may use the SDK to develop an add-on package and release the add-on package in a release package for third-part optical modules.

Accordingly, these techniques may provide flexibility in allowing development of controllers for third party hardware units on a per-vendor, per-device-type, and/or per-unit type basis. Non-compliant vendor quirks can be accommodated without fully upgrading an underlying operating system and other software of the network device. These techniques may further enable future API standardization along with the Common Management Interface Specification (CMIS).

Vendors may further induct network device manufacturer specific custom features into third party hardware units, such as power management features. Thus, third party hardware may be tuned to the network device into which the hardware is installed. Additionally or alternatively, the network device itself may be tuned. For example, host side parameters may be automatically tuned and made available for optimal working of software for controlling the hardware. The native software of the network device may further include hooks for running vendor specific elements. For example, a vendor may implement code to initialize a third party hardware unit to ensure compatibility with the network device. Furthermore, the network device manufacturer may host per-vendor, per-device add-on packages, e.g., on a website, to allow for customer re-use of add-on packages.

Figure 4:
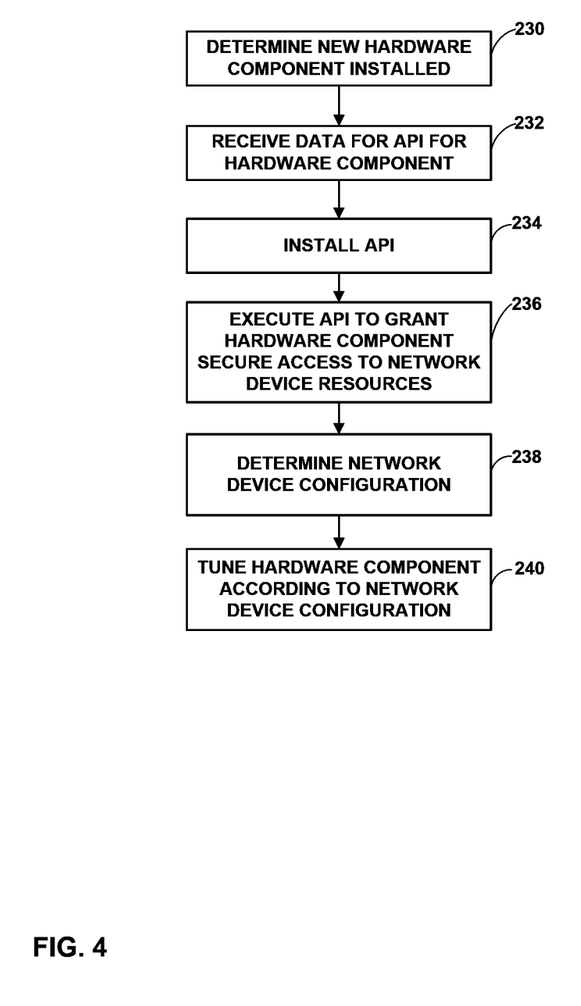
FIG. 4 is a flowchart illustrating an example method for adding a new third party hardware component to a network device according to the techniques of this disclosure.

FIG. 4 is a flowchart illustrating an example method for adding a new third party hardware component to a network device according to the techniques of this disclosure. The method of FIG. 4 is explained with respect to router 150 of FIG. 2, although other network devices (such as network device 110 of FIG. 1) may be configured to perform this or a similar method.

Initially, router 150 (and in particular, control unit 152) determines that a new hardware component (such as third party optical unit 196) has been installed (230). Control unit 152 may also receive data for an API for the hardware component (232). The API may have been developed using an API SDK produced by a manufacturer of router 150 for devices similar to the new third party hardware component.

Control unit 152 may then install the API (234) along with other controller software (such as third party hardware controller 180, third party APIs 182, and third party software 184). For example, control unit 152 may install data for the API and any other software in a memory of control unit 152.

Control unit 152 may then execute the API and other software to grant the hardware component secure access to network devices resources (236), such as registers 154, an I2C bus, or an SPI. Control unit 152 may also determine network device configuration of router 150 (238) and tune the hardware component according to the network device configuration (240). For example, control unit 152 may configure power management features of the third party hardware component according to power management configuration of router 150. As one example, if router 150 is configured to operate in low power consumption mode, control unit 152 may reduce an amount of power used to drive a light emitter (e.g., a laser) of a third party optical unit according to the configuration of router 150.

In this manner, the method of FIG. 4 represents an example of a method including receiving, by a network device, a hardware component that has been coupled to the network device; receiving, by the network device, data for an application programming interface (API) for the hardware component; and executing, by the network device, the API for the hardware component to grant the hardware component secure access to hardware resources of the network device via the API.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
   receiving, by a network routing device, a hardware component that has been directly physically coupled to the network routing device, the network routing device having been manufactured by a manufacturer and the hardware component having been developed by a third party developer different than the manufacturer, the network routing device including one or more hardware resources to which the network routing device grants secure access only to the network routing device and hardware components having application programming interfaces (APIs) developed using a software development kit (SDK) provided by the manufacturer of the network routing device prior to directly physically coupling a corresponding one of the hardware components to the network routing device;
   receiving, by the network routing device, data for an application programming interface (API) for the hardware component, the API having been developed using the SDK provided by the manufacturer of the network routing device and providing the secure access to the hardware resources to the hardware component; and
   executing, by the network routing device, the API for the hardware component to:
      tune the hardware component to the network routing device according to configuration of the network routing device;
      tune parameters of the network routing device to allow the hardware component to control the hardware resources of the network routing device; and
      grant the hardware component secure access to the hardware resources of the network routing device via the API, and
   exchanging, by the network routing device, packets with one or more other network devices via a network, including processing, by the network routing device, the packets using the tuned hardware component.

2. The method of claim 1, wherein executing the data for the API comprises granting the hardware component access to raw registers of the network routing device, an I2C bus of the network routing device, or a serial peripheral interface (SPI) of the network routing device.

3. The method of claim 1, wherein executing the data for the API comprises providing two-way communication between the network routing device and the hardware component via the API.

4. The method of claim 1, wherein executing the API for the hardware component to tune the hardware component comprises:
   determining a power management configuration for the network routing device; and
   adjusting power consumption configuration of the hardware component to conform to the power management configuration for the network routing device.

5. The method of claim 1, wherein the hardware component comprises one of a hardware security component, a hardware Ethernet network interface, a hardware line card, or a hardware optical network interface.

6. A network routing device comprising:
   one or more hardware resources to which the network routing device grants secure access only to the network routing device and hardware components having application programming interfaces (APIs) developed using a software development kit (SDK) provided by a manufacturer of the network routing device prior to directly physically coupling a corresponding one of the hardware components to the network routing device;
   a physical interface for receiving a hardware component;
   a network interface for exchanging packets with one or more other network devices via a network;
   a memory; and
   a processing system comprising one or more processors implemented in circuitry, the processing system being configured to:
      receive the hardware component that has been directly physically coupled to the physical interface of the network routing device, the network routing device having been manufactured by the manufacturer and the hardware component having been developed by a third party developer different than the manufacturer;
      receive data for an application programming interface (API) for the hardware component;
      store the data for the API to the memory;
      execute the data for the API to:
         tune the hardware component to the network routing device according to configuration data of the network routing device;
         tune parameters of the network routing device to allow the hardware component to control the hardware resources; and
         grant the hardware component secure access to the hardware resources of the network routing device via the API, and
      exchange the packets via the network interface and via the network, wherein the processing system is configured to cause the tuned hardware component to process the packets.

7. The network routing device of claim 6, wherein the one or more hardware resources comprise one or more raw registers, an I2C bus, or a serial peripheral interface (SPI), and wherein the processing system is configured to execute the data for the API to grant the hardware component secure access to the raw registers, the I2C bus, or the SPI.

8. The network routing device of claim 6, wherein the processing system is configured to execute the data for the API to provide two-way communication between the network routing device and the hardware component via the API.

9. The network routing device of claim 6, wherein the configuration data defines a power management configuration for the network routing device, and wherein to tune the hardware component, the processing system is configured to adjust power consumption configuration of the hardware component to conform to the power management configuration for the network routing device.

10. The network routing device of claim 6, wherein the hardware component comprises one of a hardware security component, a hardware Ethernet network interface, a hardware line card, or a hardware optical network interface.

11. A non-transitory computer-readable storage medium having stored thereon instructions that, when executed, cause a processor of a network routing device to:
   determine that a hardware component has been directly physically coupled to the network routing device, the network routing device having been manufactured by a manufacturer and the hardware component having been developed by a third party developer different than the manufacturer, the network routing device including one or more hardware resources to which the network routing device grants secure access only to the network routing device and hardware components having application programming interfaces (APIs) developed using a software development kit (SDK) provided by the manufacturer of the network routing device prior to directly physically coupling a corresponding one of the hardware components to the network routing device;
   receive data for an application programming interface (API) for the hardware component, the API having been developed using the SDK provided by the manufacturer of the network routing device and providing the secure access to the hardware resources to the hardware component; and
   execute the data for the API for the hardware component to:
      tune the hardware component to the network routing device according to configuration of the network routing device;
      tune parameters of the network routing device to allow the hardware component to control hardware resources of the network routing device; and
      grant the hardware component secure access to hardware resources of the network routing device via the API; and
   exchange packets with one or more other network devices via a network, including instructions that cause the processor to process the packets using the tuned hardware component.

12. The non-transitory computer-readable storage medium of claim 11, wherein the instructions that cause the processor to execute the data for the API comprise instructions that cause the processor to grant the hardware component access to raw registers of the network routing device, an I2C bus of the network routing device, or a serial peripheral interface (SPI) of the network routing device.

13. The non-transitory computer-readable storage medium of claim 11, wherein the instructions that cause the processor to execute the API comprise instructions that cause the processor to provide two-way communication between the network routing device and the hardware component via the API.

14. The non-transitory computer-readable storage medium of claim 11, wherein the instructions that cause the processor to execute the data for the API to tune the hardware component comprise instructions that cause the processor to:

determine a power management configuration for the network routing device; and adjust power consumption configuration of the hardware component to conform to the power management configuration for the network routing device.

15. The non-transitory computer-readable storage medium of claim 11, wherein the hardware component comprises one of a hardware security component, a hardware Ethernet network interface, a hardware line card, or a hardware optical network interface.

* * * * *